(12) United States Patent
Jeong et al.

(10) Patent No.: US 9,540,018 B2
(45) Date of Patent: Jan. 10, 2017

(54) RAILWAY INSTALLATION SYNCHRONIZATION MONITORING SYSTEM

(71) Applicant: Smartec Corporation, Daejeon (KR)

(72) Inventors: Soonbae Jeong, Daejeon (KR); Taejin Kim, Daejeon (KR); Gi-don Kim, Seoul (KR); Hyounwoo Kim, Daejeon (KR)

(73) Assignee: SMARTEC CORPORATION, Daejeon (KR)

( * ) Notice: Subject to any disclaimer, the term of this patent is extended or adjusted under 35 U.S.C. 154(b) by 232 days.

(21) Appl. No.: 14/404,401

(22) PCT Filed: Jul. 1, 2013

(86) PCT No.: PCT/KR2013/005797
§ 371 (c)(1),
(2) Date: Nov. 26, 2014

(87) PCT Pub. No.: WO2014/007496
PCT Pub. Date: Jan. 9, 2014

(65) Prior Publication Data
US 2015/0145962 A1 May 28, 2015

(30) Foreign Application Priority Data
Jul. 3, 2012 (KR) .................. 10-2012-0072089

(51) Int. Cl.
*H04N 13/02* (2006.01)
*H04N 5/77* (2006.01)
(Continued)

(52) U.S. Cl.
CPC ............ *B61F 9/005* (2013.01); *B61L 3/002* (2013.01); *B61L 23/042* (2013.01);
(Continued)

(58) Field of Classification Search
CPC ......... B61F 9/005; B61L 3/002; B61L 23/042; H04N 7/181; H04N 13/0007; H04N 13/0203
(Continued)

(56) References Cited

U.S. PATENT DOCUMENTS 5,808,906 A * 9/1998 Sanchez-Revuelta . G01B 11/25
250/200
6,003,232 A * 12/1999 Lopez Gomez ....... G01B 5/207
33/203

FOREIGN PATENT DOCUMENTS

JP 405126955 A * 5/1993
KR 10-2008-0103820 11/2008
(Continued)

OTHER PUBLICATIONS

International Search Report issued on Oct. 25, 2013 in International Application No. PCT/KR2013/005797.

*Primary Examiner* — Robert Chevalier
(74) *Attorney, Agent, or Firm* — H.C. Park & Associates, PLC

(57) ABSTRACT

A railway installation monitoring system may include: a laser generator that is provided on a train; a camera that is operated in connection with the laser generator so as to be capable of monitoring a railway installation and of acquiring image information data that is measured; a three-dimensional image information conversion device that uses the image information data acquired by the laser generator and the camera and converts the data into three-dimensional image information; a position determination unit that determines the position of the railway installation to be measured; a signal processing device that sends an operating command for the laser generator or/and the camera; and an overall data processing device that processes, analyzes, interprets, or
(Continued)

stores the image information data, the three-dimensional image information, or the data transmitted from the position determination unit.

4 Claims, 2 Drawing Sheets

(51) Int. Cl.
    *B61F 9/00*         (2006.01)
    *B61L 3/00*         (2006.01)
    *H04N 13/00*       (2006.01)
    *B61L 23/04*       (2006.01)
    *H04N 7/18*         (2006.01)

(52) U.S. Cl.
    CPC ..... *H04N 13/0007* (2013.01); *H04N 13/0203* (2013.01); *H04N 7/181* (2013.01)

(58) Field of Classification Search
    USPC .......... 348/47, 67, 61, 46, 73; 386/200, 224, 386/226, 227
    See application file for complete search history.

(56) References Cited

FOREIGN PATENT DOCUMENTS

| KR | 10-2009-0129643 | 12/2009 |
|---|---|---|
| KR | 10-2009-0129714 | 12/2009 |
| KR | 10-2011-0024009 | 3/2011 |
| KR | 10-1111569 | 2/2012 |

\* cited by examiner

RAILWAY INSTALLATION SYNCHRONIZATION MONITORING SYSTEM

CROSS-REFERENCE TO RELATED APPLICATIONS

This application is the National Stage of International Application PCT/KR2013/005797, filed on Jul. 1, 2013, and claims priority from and the benefit of Korean Patent application No. 10-2012-0072089, filed on Jul. 3, 2012, which are incorporated by reference for all purposes as if fully set forth herein.

BACKGROUND

Field

Exemplary embodiments of the present invention relate, in general, to a system for monitoring a railway by synchronizing dynamic characteristics of a train moving along tracks and data for monitoring railway installations with a predetermined moving distance and, more particularly, to a system for monitoring a railway installation while repeatedly accumulating and processing data obtained by measuring a rail, a streetcar line, or a tunnel structure using a monitoring apparatus including a laser generator installed on a train, a camera for obtaining three-dimensional (3D) coordinates, and a measuring device that measures vibration of a train, etc.

Discussion of the Background

Railroad and streetcar lines should be always monitored for structural integrity and safety since subway trains or trains moving along tracks are likely to be derailed. However, it's challenging to thoroughly monitor railroads and streetcar lines for safety-assurance purposes since a moving distance is long and monitoring should be performed within a short period during which trains do not move. Thus, there is a need to develop a new method of monitoring railroads and streetcar lines. In the case of subway trains moving through a subway tunnel, deteriorating tunnel structures are major targets to be safety-checked. However, it is not easy to detect cracks occurring in a deteriorating tunnel. Thus, there is a need to develop a method of continuously safety-checking railway installations. Also, although data regarding a major position is measured and obtained, the data is difficult to compare and analyze with respect to a baseline when the data is not synchronized with a measurement position.

When railroads, streetcar lines, and tunnel structures are monitored, data thereof should be obtained at the same measurement position to exactly compare the data with a baseline. That is, a fine change in a rail may be detected when data obtained at the same measurement position is continuously compared with the baseline, but is difficult to detect when data obtained at a non-fixed measurement position is compared with the baseline. However, inconvenience may be caused to a user when the current method of the related art (e.g., a method of accumulatively estimating a distance based on a rotational speed of a wheel, a method of estimating a distance by performing integral calculation using an acceleration sensor, or a method of detecting a location based on an image) is used to detect the location of a train. Thus, since it is inevitable that an error will occur, a method of initializing data after a train is stopped may be used to compensate for accumulated errors.

If data is measured when a measurement position is not fixed, safety repair work is hardly influenced by a distance error when the position of a change in a tunnel structure (cracks, a falling object, etc.) is roughly detected, but is greatly influenced by a distance error when a tiny abnormal change occurs in a rail or a streetcar line.

Also, when an image is processed using a camera that has been frequently suggested as a data measuring device, the amount of light should be high to obtain an image and a surface of a metallic structure, such as a rail, should be corrected due to scattering of reflected light. When a scanning method involving a laser is used, a change in a tunnel structure can be effectively detected when a train moves at low speeds but the detection of the change in the tunnel structure is limited when the train moves at high speeds.

Korean registered patent No. 10-1111569 entitled "System and method for monitoring railway installation using tracked vehicle" discloses a railway installation monitoring system including an information obtaining device configured to obtain and store images of a tunnel structure, tracks, and a streetcar line while a monitoring camera installed in a tracked vehicle is moved and to store noise and vibration data collected using a sensor unit installed in the tracked vehicle, and a server unit configured to receive the data collected by the information obtaining device, store the data in a database, and provide images stored in the database and the data to a situation room terminal to check the images and the data.

However, the system described above is disadvantageous in that data regarding a rail, a streetcar line, sleepers, and a tunnel structure is difficult to synchronize to a measuring position. In particular, a distance error is likely to occur in the case of items for which precise distance measurement is required, such as a rail and a streetcar line.

Furthermore, since images are captured by a camera without consideration of a moving speed and distance of a train, the same image is likely to be repeatedly captured to decrease the efficiency of storing and increase a time required for a safety check.

SUMMARY

Accordingly, exemplary embodiments of the present invention have been made keeping in mind the above problems occurring in the related art, and an object of exemplary embodiments of the present invention is to provide a solution to problems occurring during synchronization between measured data and a moving distance.

Another object of exemplary embodiments of the present invention is to provide a safety-check monitoring system including a plurality of laser stripe generators, a plurality of cameras with an image processing function for providing three-dimensional (3D) coordinates, and a measuring device for checking vibration of a train to be installed in a train moving at a predetermined speed or more, so as to safety-check railway installations such as a rail, a streetcar line, sleepers, and a tunnel structure.

A further object of exemplary embodiments of the present invention is to provide a safety-check monitoring apparatus capable of providing a very precise measurement position for an object to be measured by synchronizing a measurement position with the positions of sleepers installed on a track at uniform intervals, based on a rotational speed of a wheel that may include an error since the wheel is likely to slip, thereby enabling major objects to be always measured at the same position.

Yet another object of exemplary embodiments of the present invention is to provide a safety-check monitoring apparatus capable of precisely detecting the position of an object to be measured and providing information regarding the measured position regardless of whether a train moves at a high or low speed, thereby greatly increasing the reliability of safety-check data.

In order to accomplish the above objects, the present invention provides a railway installation monitoring system including a laser generator (200) installed on a train; a camera (100) operated while being interlinked with the laser generator, and configured to monitor a railway installation and receive image information data measured; a three-dimensional (3D) image information conversion device (110) configured to convert image information data, which is obtained through the laser generator and the camera, into 3D image information; a position checking unit (300) configured to detect the position of the railway installation to be measured; a signal processor (400) configured to generate a command to operate the laser generator or the camera; and an integrated data processor (500) configured to process, analyze, interpret, or store the image information data, the 3D image information, or data transmitted from the position checking unit.

The position checking unit may include a dynamic behavior measuring device (310) configured to sense a motion of the train; a distance measuring sensor (320) configured to measure a moving position of the train; a speed measuring device (330); a high-speed precision clock (340); and an information processor (350) configured to process information received from the dynamic behavior measuring device (310), the distance measuring sensor, or the speed measuring device (330).

The railway installation, the image information of which is obtained through the laser generator (200) and the camera (100) may include at least one among a rail, a streetcar line, sleepers, and a tunnel structure.

The system may be capable of performing data acquisition (DAQ) on distance information measured by the position checking unit and image information regarding a section of the railway installation corresponding to the distance information.

According to exemplary embodiments of the present invention, a position checking unit may measure an exact position of a track, a streetcar line, sleepers and/or a tunnel installation. Thus, the precision and reliability of data obtained using a railway installation monitoring system according to the exemplary embodiments of present invention may be much higher than in the related art.

In particular, the precision of data can be greatly increased since a distance error hardly occurs even with respect to a track or a streetcar line.

Also, according to exemplary embodiments of the present invention, since data can be accumulatively stored at a uniform measurement position, effective comparison data can be produced to safety check a railway installation, thereby improving the efficiency of installation management.

Also, according to exemplary embodiments of the present invention, monitoring can be continuously performed and a time required for the monitoring can be reduced so as to be used for maintenance and repair of installations, thereby increasing the time available for performing safety maintenance and repairs. Furthermore, accumulated data can be provided and visualized in the form of three-dimensional (3D) image information data. Accordingly, the efficiency of storing and processing data may be increased more than when data is accumulated using images captured by a camera according to the related art.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
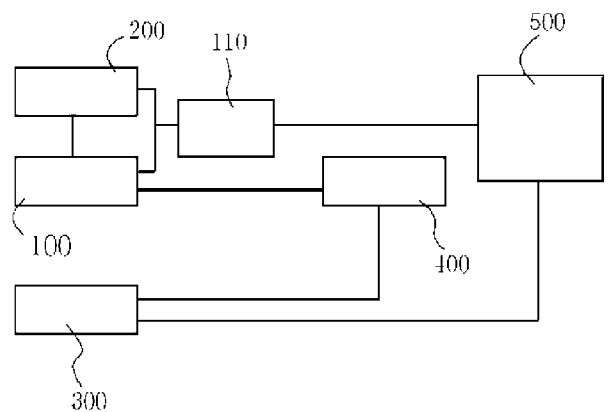
FIG. 1 illustrates a structure of a railway installation monitoring system according to an embodiment of the present invention.
Figure 2:
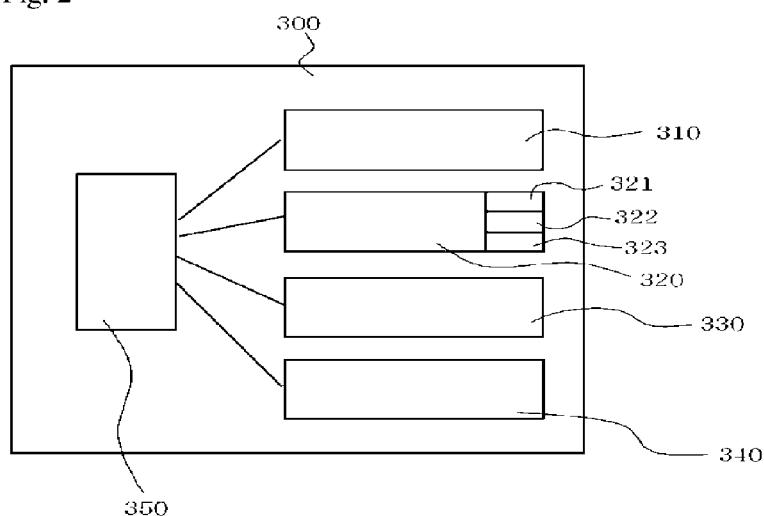
FIG. 2 is a conceptual diagram illustrating a structure of a position checking unit according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Exemplary embodiments of the present invention provide a railway installation monitoring system including a laser generator 200 installed on a train, a camera 100 operated while being interlinked with the laser generator 200 and configured to obtain image information data to monitor and measure major railway installations, a three-dimensional (3D) image information conversion device 110 for converting image information data obtained through the laser generator 200 and the camera 100 into 3D image information, a position checking unit 300 for detecting the position of a railway installation to be measured, a signal processor 400 for generating a command to operate the laser generator 200 and the camera 100, and an integrated data processor 500 for processing, analyzing, interpreting, or storing the image information data, the 3D image data, and/or distance information and/or speed information transmitted from the position checking unit 300.

Exemplary embodiments of the present invention relate to an apparatus for monitoring and measuring a defect of a railway installation while a train is running. For continuous management of a railway installation, it is important to precisely detect the position of the railway installation to be measured and accumulate information thereof.

In the present disclosure, the term 'railway installation' should be understood as covering rails, streetcar lines, sleepers, tunnel structures, etc.

Thus, exemplary embodiments of the present invention include the position checking unit 300 installed to precisely detect the position of a railway installation. As described above as the problems of the related art, it is very important to detect an exact position of a railway installation disposed along a track and identify the railway installation. Thus, a distance error occurring due to a fine change in, for example, a rail or a streetcar line is one of factors that lower the reliability of data.

A position checking unit according to an embodiment of the present invention performs a function and an operation of precisely detecting the position of a rail, a streetcar line, a sleeper and/or a tunnel structure by using various measurement coefficients related to a speed, a distance, etc. while a train is running.

The position checking unit performs a function of providing a signal processor with distance information for operating a laser generator and a camera to obtain image information regarding a tunnel structure among the above railway installations, and a function of detecting an exact position corresponding to image information regarding a railway installation, e.g., a rail, a streetcar line, or a tunnel structure.

The position checking unit 300 according to an embodiment of the present invention includes a dynamic behavior measuring device 310 that senses a motion of a train, a distance measuring sensor 320 that measures a moving position of a train, a speed measuring device 330, a high-speed precision clock 340, and an image processor 350 including a micro-controller unit (MCU), a central processing unit (CPU) or an electronic circuit that processes information received from these devices or the sensor.

As described above, if data is measured at a non-fixed position, detecting a rough position of a change in a tunnel structure (e.g., cracks, a falling object, etc.) is hardly influenced by a distance error, but the reliability of data is greatly decreased due to the distance error when a fine change occurs in a rail or a streetcar line.

With a position checking unit according to an embodiment of the present invention, not only the position of a tunnel structure but also the positions of a rail and a streetcar line may be very precisely detected.

In the present disclosure, the term "dynamic behavior measuring device" should be understood as a means or device for detecting whether a train is moving or not, and may be generally embodied as a device or encoder that measures acceleration or the like.

The dynamic behavior measuring device 310 performs a function of determining whether a distance measuring sensor is to be operated when a train is stopped, as will be described in detail below. That is, the dynamic behavior measuring device 310 performs a function of stopping the distance measuring sensor when a train is stopped and operating the distance measuring sensor 320 again when the train moves.

The distance measuring sensor 320 according to the present invention may perform distance measurement in a manner that is remarkably different than a method according to the related art.

In the present disclosure, the term "distance measuring sensor" should be understood as a device capable of measuring a distance using laser.

Thus, the distance measuring sensor 320 includes a laser generator 321, a counter 322 that counts the number of sleepers by receiving reflected light from the laser generator 321, and a transmission unit 323 that transmits counting information received from the counter 322.

In a distance measuring sensor according to an embodiment of the present invention, the number of sleepers installed along a track to a certain railway installation (e.g., a tunnel structure) from a starting point of a train (e.g., Seoul Station) is counted by a counter, based on reflected light of the laser.

The distance to the tunnel structure from the starting point is calculated by multiplying the number of sleepers by the distance between the sleepers.

For example, if the distance between the sleepers is 100 cm and the number of the sleepers is counted to be 100,000, it may be precisely detected that the tunnel structure is located at a position spaced by 100 km from Seoul Station.

Similarly, the position of a rail, a streetcar line, or a sleeper may be very precisely detected.

As described above, the position of railway installations are preset with respect to a reference point, and whether a railway installation corresponds to the present position may be detected by counting the number of sleepers using the above distance measuring sensor.

In this case, the reference point and the position of a certain railway installation may be used since they are previously stored as set values in the form of data in the image processor 340.

According to an embodiment of the present invention, since an error may occur in a position calculated using the distance measuring sensor, information for correcting the position is provided based on a speed and time calculated using the speed measuring device 330.

In the present disclosure, a speed measuring device should be understood as a mechanical or electronic speed measuring device that measures the speed of a train by measuring the rotational speed of a wheel of the train. A tachometer that has been generally used may be employed as the speed measuring device.

The speed of a train may be measured every hour using the tachometer and stored in the form of digital data, and the distance of the train from a reference point may be calculated based on the relationship between the speed and an exact time measured using the high-speed precision clock 340.

That is, as described above, the distance between a train and Seoul station may be estimated by measuring the initial speed of the train from a reference point (e.g., Seoul station) and performing an integral operation on the relationship between the speed of the train and a time measured by the high-speed precision clock 340.

Since distance=(speed×time), the speed of the train may be calculated every hour using an integral function of the time. The integral operation is performed by the information processor 350.

An integral operation function may be performed using an application program installed in the information processor 350.

In this case, the distance may not be calculated when it is determined that the train does not move, based on the relationship between information regarding whether the train moves or not, which is provided from the dynamic behavior measuring device 310, and time information provided from the high-speed precision clock. Also, when the train does not move, the speed of the train is 0(zero) and thus the distance between the train and the reference point may not be calculated.

According to the present invention, the position of a railway installation calculated using a distance measuring sensor and a speed measuring device as described above may be more precisely measured and synchronized.

Thus, as described above, based on distance measurement data obtained through a distance measuring sensor, the position of a railway installation (a rail, a streetcar line, a tunnel structure, a sleeper, etc.) corresponding to the image information obtained through the laser generator and a camera operated while being interlinked with the laser generator or 3D image information may be precisely detected.

That is, a distance estimated by the distance measuring sensor and a distance estimated by the speed measuring device may be different. Thus, an exact distance may be detected based upon a relationship between the two distances.

Thus, operational signal information is provided to a signal processor (which will be described below) by setting in advance, in the image processor, a relationship between distance information obtained using the distance measuring sensor and distance information obtained using the speed measuring device by a user.

For example, a distance may be precisely measured by counting the number of sleepers using the distance measuring sensor according to the present invention. Thus, a position corresponding to a distance, corresponding to image information obtained using the laser generator and the camera, is detected using the distance measuring sensor.

However, when an error occurs during measuring of a distance due to a loss of a sleeper, distance information obtained using the speed measuring device may be stored as auxiliary distance information to be compared with the above distance information.

Thus, a distance of a target railway installation may be precisely calculated based on the auxiliary distance information obtained using the speed measuring device.

In particular, when a tunnel structure disposed at a specific point on a rail is monitored, distance information obtained using the distance measuring sensor is set as a reference value, and a midpoint between distances estimated by the distance measuring sensor and the speed measuring device is set as a starting point for operating the laser generator and the camera. When the midpoint is recognized, operational signal information may be transmitted to the signal processor.

Also, as described above, distance information measured by the distance measuring sensor and distance information measured by the speed measuring device with respect to a certain railway installation (e.g., a tunnel structure) may be accumulatively stored.

The distance information measured by the distance measuring sensor and the distance information measured by the speed measuring device may be used to more precisely measure the position of a railway installation to be monitored, and used as information for synchronizing the railway installation with a distance.

Thus, the position of the railway installation may be more precisely detected to obtain image information using the laser generator and the camera.

However, the above example is just one exemplary embodiment, and synchronization may be performed by setting, in advance, distance information measured by the distance measuring sensor and distance information measured by the speed measuring device in various manners according to a user's desire and request.

The distance information obtained using the distance measuring sensor and the speed measuring device is provided to not only the signal processor 400 but also the integrated data processor 500, as will be described below.

Thus, as described above, distance information obtained using a distance measuring sensor and a speed measuring device included in a position checking unit is transmitted to a signal processor, and the signal processor instructs a laser generator and/or a camera to generate an operational signal according to information based on the distance information.

Furthermore, the distance information may be used for an integrated data processor to detect the position of a railway installation.

In the present disclosure, the signal processor 400 should be understood as a device or means for providing an operational signal generated by a laser generator and/or a camera with respect to a tunnel structure.

Thus, the signal processor 400 operates a laser generator and/or a camera for monitoring a tunnel structure, based on operational signal information received from the position checking unit 300. That is, the signal processor 400 operates a laser scanner and/or a camera for a tunnel structure.

According to the present invention, railway installations including the tunnel structure should be always monitored and thus image information thereof is continuously obtained using a laser generator and a camera.

However, since a tunnel structure is located on a predetermined position on a rail, image information regarding the tunnel structure may be obtained at the predetermined position.

As described above, the position of a tunnel structure may be precisely detected using the position checking unit, and image information thereof may be obtained using laser and a camera to determine whether the tunnel structure is defective.

In the present disclosure, the laser generator 200 should be understood to be a general device or means for generating a laser beam and radiating the laser beam to an object so as to detect the shape of the object, a crack occurring in the object, or a defect of the object.

Thus, according to the present invention, a general laser may be used but a laser stripe generator may preferentially be used.

In the present disclosure, the camera 100 should be understood as a general device or means including various devices or means capable of obtaining general image information.

Thus, a camera according to an embodiment of the present invention may obtain image information reflected from the laser generator.

As described above, image information obtained using a laser generator and a camera operated while being interlinked with the laser generator is converted into 3D image information by a 3D image conversion device and then transmitted to the integrated data processor, as will be described below.

Image information that is not converted into 3D image information may be also transmitted to the integrated data processor.

In the present invention, a device that receives image information from a laser generator and a camera operated while being interlinked with the laser generator and converts the image information into 3D image information may be embodied as a general device or means capable of processing image information to be 3D image information.

Therefore, according to an exemplary embodiment of the present invention, image information regarding a railway installation is obtained using a laser generator installed on a running train and a camera operated while being interlinked with the laser generator, and converted into 3D image information through the 3D image conversion device to determine whether the railway installation is defective based on the 3D image information.

That is, when a laser stripe generated by a laser generator, installed on a train, collides with a railway installation and is then reflected from the railway installation, a camera obtains the reflected laser as image information. When image information is continuously obtained according to the above method, the image information is integrated into 3D image information.

The 3D image information is obtained as image information regarding a railway installation present at a specific position.

A 3D image conversion device according to an embodiment of the present invention will be described below.

However, the above embodiment is merely an example of a 3D image conversion device and the present invention is thus not limited thereto. Various devices capable of converting an image into a 3D image using laser and a camera are within the scope of the present invention.

The 3D image conversion device includes a CPU that processes and analyzes image information obtained using a laser generator and a camera operated while being interlinked with the laser generator, and a memory. The CPU may include a coordinate extraction unit that extracts coordinates of image information, and an error detection unit or an additional observation and determination unit.

A 3D image conversion device according to another embodiment of the present invention may be configured to convert image information obtained using a laser generator (laser scanner) and a camera into 3D image information in a manner similar to the method disclosed in Korean registered patent No. 10-0898601. Here, the laser scanner may be considered as the same concept as a laser generator according to the present invention.

The 3D image conversion device according to another embodiment of the present invention includes a CPU that processes and analyzes image information obtained through a laser generator and a camera, and a memory. The CPU may include a laser generator controller that extracts characteristic information and coordinates of a point on a railway installation to be photographed, based on data measured by the laser generator; and a camera controller that transmits the coordinates to the camera so that the camera may photograph the coordinates to obtain image information.

In the 3D image conversion device, measurement data detected by the laser generator while a train moves through a tunnel in an axial direction is transmitted to the laser generator controller. The laser generator controller extracts the characteristic information and coordinates of the point from the measurement data to detect a defect or a main portion of the railway installation to be additionally observed, and transmits the coordinates of the defect or the main portion to the camera drive controller.

The camera drive controller transmits the coordinates received from the laser generator controller to the camera. The camera obtains image data by capturing an image of the coordinates. Accordingly, the camera may obtain an image corresponding to the coordinates.

3D image information may be obtained from the measurement data detected by the laser generator and the image information obtained by the camera.

The 3D image conversion device that converts image information obtained through the laser generator and the camera into 3D image information may be integrally formed with the integrated data processor or may be separately installed.

Figure 3:
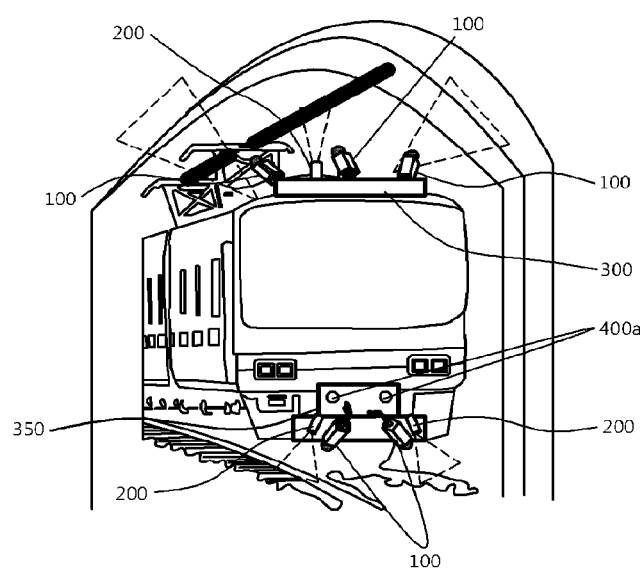
FIG. 3 illustrates laser generators and cameras installed on a train.

According to the present invention, a laser generator is installed on a train to radiate laser to at least one among a rail, a streetcar line, sleepers, and a tunnel structure as illustrated in FIG. 3.

Also, a camera operated while being interlinked with the laser generator is installed to perform photographing at least one among a rail, a streetcar line, sleepers, and a tunnel structure.

In general, two laser generators and two cameras may be installed for a rail, one laser generator and one camera may be installed for a streetcar line, and one laser generator and one camera may be installed for sleepers, but embodiments of the present invention are not limited thereto.

The laser generator installed for sleepers may also serve as a counter for counting the number of sleepers.

Figure 4:
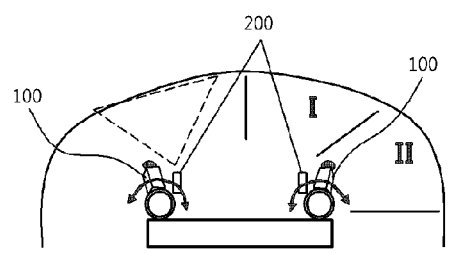
FIG. 4 is a conceptual diagram of laser generators and cameras installed for a tunnel structure that is partitioned into several parts.

As illustrated in FIG. 4, laser generators for a tunnel structure may be installed in a such a manner that the tunnel is partitioned into several parts (e.g., parts I, II, etc.) and the number of laser generators is determined to radiate laser to the partitioned parts of the tunnel, in consideration of a cylindrical shape of the tunnel.

The number of cameras operated while being interlinked with the laser generators may be equal to the number of the laser generators.

Furthermore, according to an embodiment of the present invention, a laser generator and a camera for a tunnel structure may each include a measurement direction changing device to change a direction in which a laser beam is generated and change a photographing position.

As described above, according to the present invention, a camera is installed on a position on a train such that it may photograph at least one among a rail, a streetcar line, sleepers, and a tunnel structure so as to obtain information provided from the laser generator.

Image information regarding at least one among a rail, a streetcar line, sleepers, and a tunnel structure, which is obtained through a laser generator and a camera operated while being interlinked with the laser generator, is converted into 3D image information by the 3D image information conversion device.

Thus, the 3D image information regarding at least one among the rail, the streetcar line, the sleepers, and the tunnel structure is transmitted to the integrated data processor 500.

As described above, the integrated data processor 500 should be understood as a device or means capable of processing, analyzing, interpreting, or storing data (such as image information obtained through the laser generator and the camera operated while being interlinked with the laser generator, 3D image information converted from image data through an image information conversion device, etc.) or data regarding a speed, a distance, etc., transmitted from a position checking unit.

Thus, a CPU, an information storage device, and an application program are installed in the integrated data processor 500.

Through the application program, data (such as image information obtained through the laser generator and the camera and/or 3D image information obtained through an image information conversion device) and/or data regarding a speed, a distance, etc., transmitted from the position checking unit may be transmitted and stored accumulatively, and may be processed, analyzed, and interpreted to determine whether a rail, a streetcar line, sleepers, or a tunnel structure is defective.

Accordingly, an integrated data processor according to an embodiment of the present invention may include a non-transitory computer readable recording medium for performing an operation according to the present invention.

The non-transitory computer readable recording medium may store program commands, data files, data structures, etc. solely or in combination. The non-transitory computer readable recording medium may be specially designed and configured for the application program employed in the present invention or may be well-known to those of ordinary skill in the field of computer software.

Examples of the non-transitory computer readable recording medium include magnetic media (such as a hard disc, a floppy disk, a magnetic tape, etc.), optical media (such as a CD-ROM, a DVD, etc.), magneto-optical media (such as a floptical disk), and hardware devices (such as a ROM, a RAM, a flash memory, etc.) specially configured to store and execute a program command.

Examples of the application program include not only machine language code made using a compiler but also high-level language code that can be executed by a computer through an interpreter or the like.

The present invention provides a railway installation monitoring system capable of performing data acquisition (DAQ) to input/output data (such as distance information sensed by a position checking unit, image information obtained through a laser generator installed in a section corresponding to the distance information and a camera operated while being interlinked with the laser generator, and/or 3D image information obtained through an image information conversion device).

The present invention also provides a railway installation monitoring system capable of measuring data for, not only distance information through the position checking unit, but also distance information provided from a distance measuring sensor to receive corrected distance information and/or speed information obtained through a speed measuring device.

The measuring of the data may be performed by the CPU, the information storage device, and the application program installed in the integrated data processor.

As described above, the present invention provides a system for monitoring a railway installation by synchronizing it with a moving train.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A railway installation monitoring system comprising:
   a laser generator installed on a train;
   a camera configured to be operated while being interlinked with the laser generator, and configured to monitor a railway installation and receive and produce image information data measured;
   a three-dimensional image information conversion device configured to convert image information data, which is obtained through the laser generator and the camera, into 3D image information;
   a position checking unit configured to detect the position of the railway installation to be measured;
   a signal processor configured to operate at least one of the laser generator and the camera; and
   an integrated data processor configured to perform at least one of processing, analyzing, interpreting, and storing at least one of the image information data, the 3D image information, and data transmitted from the position checking unit.

2. The system of claim 1, wherein the position checking unit comprises:
   a dynamic behavior measuring device configured to sense a motion of the train;
   a distance measuring sensor configured to measure a moving position of the train;
   a speed measuring device;
   a high-speed precision clock; and
   an information processor configured to process information received from at least one of the dynamic behavior measuring device, the distance measuring sensor, and the speed measuring device.

3. The system of claim 1, wherein the image information data comprises data representing at least one among a rail, a streetcar line, sleepers, and a tunnel structure.

4. The system of claim 1, wherein the integrated data processor is further configured to perform data acquisition (DAQ) on distance information measured by the position checking unit and image information regarding a section of the railway installation corresponding to the distance information.

* * * * *